United States Patent [19]

Anagnostopoulos et al.

[11] Patent Number: 4,490,037
[45] Date of Patent: Dec. 25, 1984

[54] IMAGE SENSOR AND RANGEFINDER DEVICE HAVING BACKGROUND SUBTRACTION WITH BRIDGE NETWORK

[75] Inventors: Constantine N. Anagnostopoulos, Mendon; Lee F. Frank, Rochester, both of N.Y.

[73] Assignee: Eastman Kodak Company, Rochester, N.Y.

[21] Appl. No.: 409,257

[22] Filed: Aug. 18, 1982

[51] Int. Cl.$^3$ ............................. G01C 3/10; G03B 7/08
[52] U.S. Cl. ................................................ 356/1; 354/403
[58] Field of Search ...................... 250/210, 201, 204; 356/1, 4; 354/402, 403, 408, 409; 358/161; 377/37, 53, 54; 307/238.8

[56] References Cited

U.S. PATENT DOCUMENTS

| | | | |
|---|---|---|---|
| 3,394,642 | 7/1968 | Haruo Teshi et al. | 250/210 X |
| 4,117,514 | 9/1978 | Terui et al. | 377/53 X |
| 4,173,723 | 11/1979 | Temes et al. | 377/53 X |
| 4,274,735 | 6/1981 | Tamura et al. | 356/1 |

*Primary Examiner*—S. C. Buczinski
*Assistant Examiner*—John B. Sotomayor
*Attorney, Agent, or Firm*—Thomas H. Close

[57] ABSTRACT

A rangefinder device includes means for projecting a beam of light to illuminate a small area on an object in a scene, an array of photosensors for sensing an image of the scene, and signal processing means responsive to the photosignals from the photosensors for determining the relative location of the illuminated small area in the image of the scene. The rangefinder device includes an image sensor having means for removing the contribution due to ambient scene illumination from the photosignals. The image sensor includes a plurality of photosensitive elements, comprising a photosensor, a charge storage element and a bridge network of switches arranged for selectively connecting the photosensor to the charge storage element in such a manner as to selectively add photocurrent to the storage element or to remove photocurrent from the storage element. The rangefinder device is first operated with the light beam on and the bridge networks connected to add photocurrent to the storage elements. The device is then operated with the light beam off and the bridge networks connected to remove photocurrent from the storage elements. The difference signals remaining in the storage elements are free from contributions due to ambient scene illumination.

The image sensor includes an analog shift register for receiving the difference signals in parallel from the storage elements and delivering them serially to a peak detector circuit. The peak detector circuit locates the position of the illuminated small area by sensing the maximum difference signal in a series.

6 Claims, 11 Drawing Figures

IMAGE SENSOR AND RANGEFINDER DEVICE HAVING BACKGROUND SUBTRACTION WITH BRIDGE NETWORK

BACKGROUND OF THE INVENTION

Cross Reference to Related Applications

Reference is hereby made to the following copending U.S. Patent Applications filed on even date herewith:

U.S. Ser. No. 409,256, entitled "Image Sensor and Rangefinder Device Having Background Subtraction With Paired Analog Shift Registers" by C. Anagnostopoulos;

U.S. Ser. No. 409,259, entitled "Image Sensor and Rangefinder Device with Background Subtraction Using Interlaced Analog Shift Registers" by D. Lambeth; and U.S. Ser. No. 409,258, entitled "Rangefinder with Serial Readout Linear Image Sensor and Peak Detector with Threshold Setting Means" by D. Lambeth.

1. Field of the Invention

The present invention relates to automatic rangefinders and image sensors for use therewith, and more particularly to such rangefinders of the type wherein a beam of light is projected on a scene to illuminate a small area on an object, and an image sensor senses the location of the small area in an image of the scene to determine the distance to the object in the scene.

2. Description of the Problem

In one type of automatic rangefinder, a beam of light is projected upon an object in a scene to form an illuminated small area on the object. An image of the scene including the illuminated small area, is formed on a linear image sensor. The location of the illuminated small area along the image sensor is determined by the distance to the object in the scene. Such a rangefinder device finds application for example in an automatic focusing camera.

The general arrangement of elements and mode of operation of such a rangefinding device will be described with reference to FIG. 1. Means for projecting a beam of light is shown by way of example as a light emitting diode (LED) 1 and a lens 2. The beam is projected along a path 3 to illuminate a small area on an object $O_1$ in a scene. The scene is imaged by a second lens 4 onto an image sensor comprising a linear array of photosensors 5. The signals produced by the photosensors are analyzed by control electronics 6 to determine the position of the illuminated small area in the scene and produce a signal representing the distance to the object.

As shown by example in FIG. 1, the apparent position of the illuminated small area in the scene is a function of distance along light path 3 to the object. For an object $O_1$ located at a distance $D_1$ from the rangefinding device, the image of the iluminated small area will fall on the sensor array at location $S_1$. For an object $O_2$ at a further distance $D_2$, the image of the small area will fall on the sensor array at location $S_2$. By examining the output of the sensor array, the control electronics determines (for example, by comparing the outputs of the elements to determine that output which is a maximum) the location of the illuminated small area in the scene and thereby the distance to the object.

When the ambient illumination is relatively bright, the scene itself, regardless of the illuminated small area, will produce substantial modulation of the photosensor array. Under such circumstances, it is not possible to determine the location of the illuminated small area merely by examining the outputs of the photosensors. The effects of ambient scene light can be removed however by operating the sensor with the beam off and again with the beam on, and subtracting the signals produced thereby. The information in the difference signal is solely from the illuminated small area. One way of accomplishing this subtraction is shown in U.S. Pat. No. 4,274,735 issued June 23, 1981 to Tamura et al. Tamura et al disclose a device having a pair of memory capacitors associated with each photosensitive element in the array. The capacitors are selectively connectable to the photosensitive elements by field effect transistor (FET) switches, and each pair is further connectable to an associated differential amplifier. In operation, a photosensor is first connected to one of the capacitors while the light beam is off. The photosensor is then connected to the other capacitor while the light beam is on. Both the capacitors are then connected to the differential amplifier to produce a photosignal free from background information. The photosignals are compared in an array of comparators to determine the location of the illuminated small area by sensing the largest difference signal from the array of differential amplifiers.

To effectively remove the relatively large background photosignal from the relatively small photosignal due to the illuminated small area, each of the differential amplifiers must have very good common mode rejection. Furthermore, so that the amplifiers themselves do not introduce overwhelming pattern noise into the photosignals, they must be very closely matched. The need for a plurality of closely matched differential amplifiers exacts a high price on any attempt to increase the signal-to-noise ratio of the device.

Furthermore, the use of an array of comparators to determine the maximum difference signal from the differential amplifiers complicates the signal processing circuitry.

There was a need therefore, to simplify the signal processing electronics of the rangefinder while improving the signal-to-noise ratio achievable therein.

SOLUTION TO THE PROBLEM—SUMMARY OF THE INVENTION

According to my invention a rangefinding device of the type described above, includes an improved image sensor having an array of improved photosensitive elements comprising a photosensor, a charge storage element, and a bridge network of switches arranged for selectively connecting the photosensor to the storage element in such a way as to add photocurrent to the storage element, or to remove photocurrent from the storage element. The image sensor is operated first with the light beam on and with the bridge network connected to add photocurrent to the storage elements. The image sensor is then operated with the light beam off and the bridge network connected to remove photocurrent from the storage elements. The difference signals thus remaining in the storage elements are free from contributions due to ambient scene illumination. The image sensor includes an analog shift register for receiving the difference signals from the storage elements in parallel and delivering them serially to a peak detector circuit. The peak detector locates the position of the illuminated small area by sensing the maximum difference signal.

In a preferred embodiment of the invention, the analog shift register comprises a charge coupled device (CCD) shift register and the storage elements are charge coupled to the CCD shift register by means of a transfer gate. In the preferred embodiment of the invention, the array of photosensors, the array of storage elements, the bridge network switches, and the CCD shift register are integrated on a common substrate.

BRIEF DESCRIPTION OF THE DRAWINGS

The invention will be described with reference to the accompanying drawings, wherein.

DESCRIPTION OF THE PREFERRED EMBODIMENTS

Figure 1:
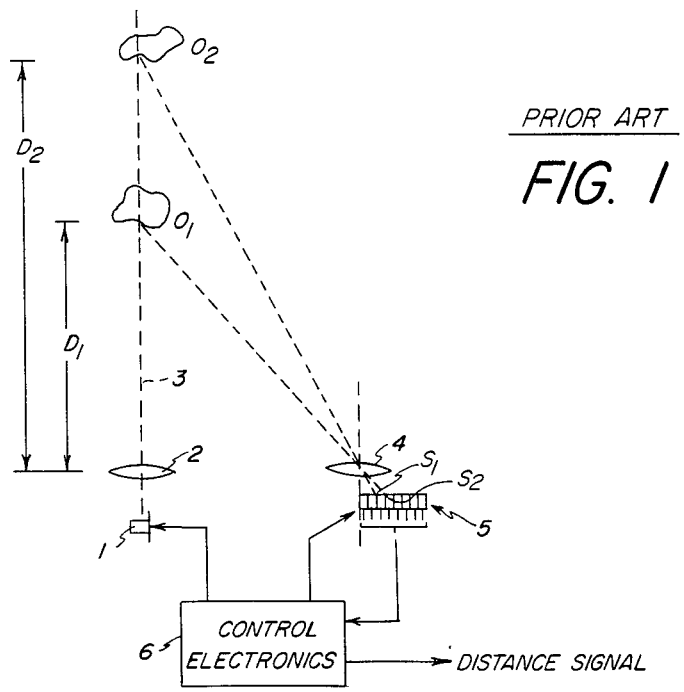
FIG. 1 is a schematic diagram of a rangefinder of the type to which the present invention pertains.
Figure 2:
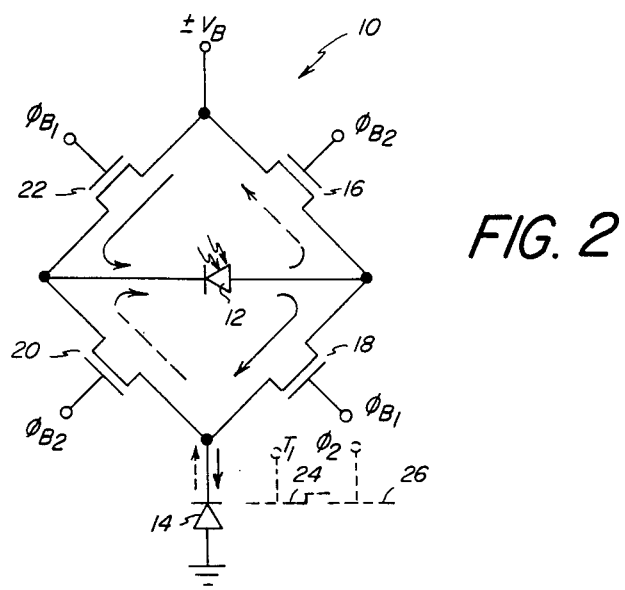
FIG. 2 is a schematic diagram of a bridge network photosensitive element for use in an image sensor according to the present invention.

Referring first to FIG. 2, a photosensitive element, generally designated 10, according to the present invention is shown. These elements (located at $S_1$, $S_2$ etc., FIG. 1) each includes a photosensor such as a photodiode 12, charge storage means such as a storage diode 14, and four FET switches 16, 18, 20 and 22 forming a bridge network for controllably connecting the photodiode between a bias voltage $\pm V_B$ and the cathode of storage diode 14. When FET switches 16 and 20 are open, and switches 18 and 22 are closed, the photodiode is connected to the storage diode anode-to-cathode and photocurrent generated by the photodiode 12 flows in the direction of the solid arrows to accumulate photocharge on the capacitance of storage diode 14. Conversely, when FET switches 18 and 22 are open and 16 and 20 are closed, the photodiode is connected to the storage diode cathode-to-cathode and photocurrent generated by the photodiode 12 flows in the direction of the phantom arrows to remove photocharge from the storage diode 14. The state of FET switches 18 and 22 is controlled by a bridge control signal $\Phi B_1$ applied to their respective gates, and the state of FET switches 16 and 20 is controlled by a bridge control signal $\Phi B_2$.

Storage diode 14 is charge coupled to the charge transfer channel of a charge coupled device (CCD) shift register (not shown in FIG. 2) by a transfer gate 24 (shown in phantom since it is not a part of bridge network photosensitive element 10). Net photocharge accumulated on storage diode 14 is transferred to the CCD device by applying a transfer pulse $T_1$ to the transfer gate 24. One of the transfer electrodes 26 (shown in phantom) of the CCD shift register is shown in FIG. 2.

The CCD shift register is arranged to transfer the photocharge in a direction generally perpendicular to the plane of the drawing in FIG. 2.

In operation, the bias voltage $\pm V_B$ is set for ground and bridge control signals $\Phi B_1$ and $\Phi B_2$ are applied to momentarily close all four FET switches 16, 18, 20, and 22 to initialize the photodiode 12 and the storage diode 14. Next, bridge control signals $\Phi B_1$ and $\Phi B_2$ are applied to the FET switches to connect the photodiode to the storage diode anode-to-cathode, and a positive bias voltage $+V_B$ (e.g. +5 volts) is applied to reverse bias the photodiode. The photodiode is exposed to light for a predetermined time during which a photocharge is accumulated on the storage diode 14. Then, the bridge control signals $\Phi B_1$ and $\Phi B_2$ are reversed to connect the photodiode to the storage diode cathode-to-cathode, and the polarity of the bias voltage $-V_b$ is inverted (e.g. −5 volts) to maintain the reverse bias on the photodiode. The photodiode is exposed to light for a second predetermined time interval during which photocharge is removed from the storage diode 14. After the second exposure, bridge control signals $\Phi B_1$ and $\Phi B_2$ may be applied to disconnect the photodiode from the storage diode, or the steps of accumulating and removing photocharge from the storage diode may be repeated several times before disconnecting the photodiode to improve the signal to noise ratio of the device. The photocharge remaining on the storage diode 14 is the difference between the amount of photocharge applied to the storage diode and the amount of photocharge removed. As explained below, this feature is employed in a rangefinder to remove the contribution due to the ambient illumination from the photocharge produced by the photosensitive elements.

Figure 3:
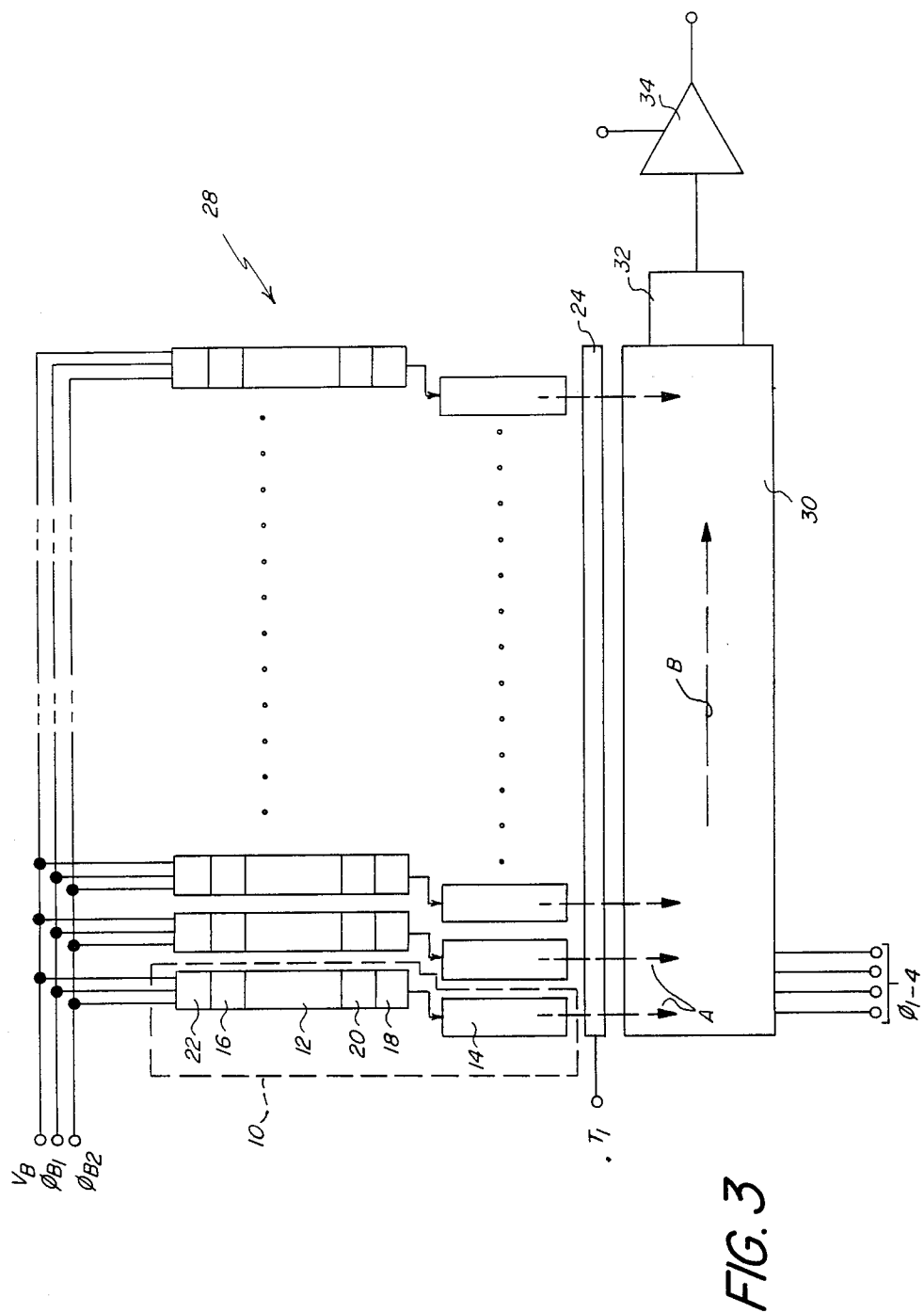
FIG. 3 is a schematic diagram of an image sensor according to the present invention.

Referring now to FIG. 3, a linear image sensor, generally designated 28, comprising bridge network photosensitive elements according to the present invention is shown. The image sensor 28 includes a linear array of bridge network photo-sensitive elements 10 as described above, where individual components are similarly numbered. The storage diodes 14 are charge coupled to a CCD shift register 30 by transfer gate 24. CCD shift register 30 is a conventional four-phase buried channel CCD shift register controlled by four-phase clock signals $\Phi_{1-4}$ and having an output diode 32. An output preamplifier 34 detects the signal on the output diode 32.

Photocharges accumulated in the storage diodes 14 are transferred in parallel under control of transfer signal $T_1$ in the direction of arrows A into the CCD shift register, and are then shifted serially in the direction of arrow B under control of the four-phase clock signals $\Phi_{1-4}$ to output diode 32. The photosignals are detected at the output diode by output preamplifier 34.

Preferably, the array of bridge network photosensitive elements 10 and the CCD shift register 30 are integrated on a common substrate, using well known integrated circuit techniques. A presently preferred embodiment of the integrated image sensor will now be described with reference to FIGS. 4, 5 and 6.

Figure 4:
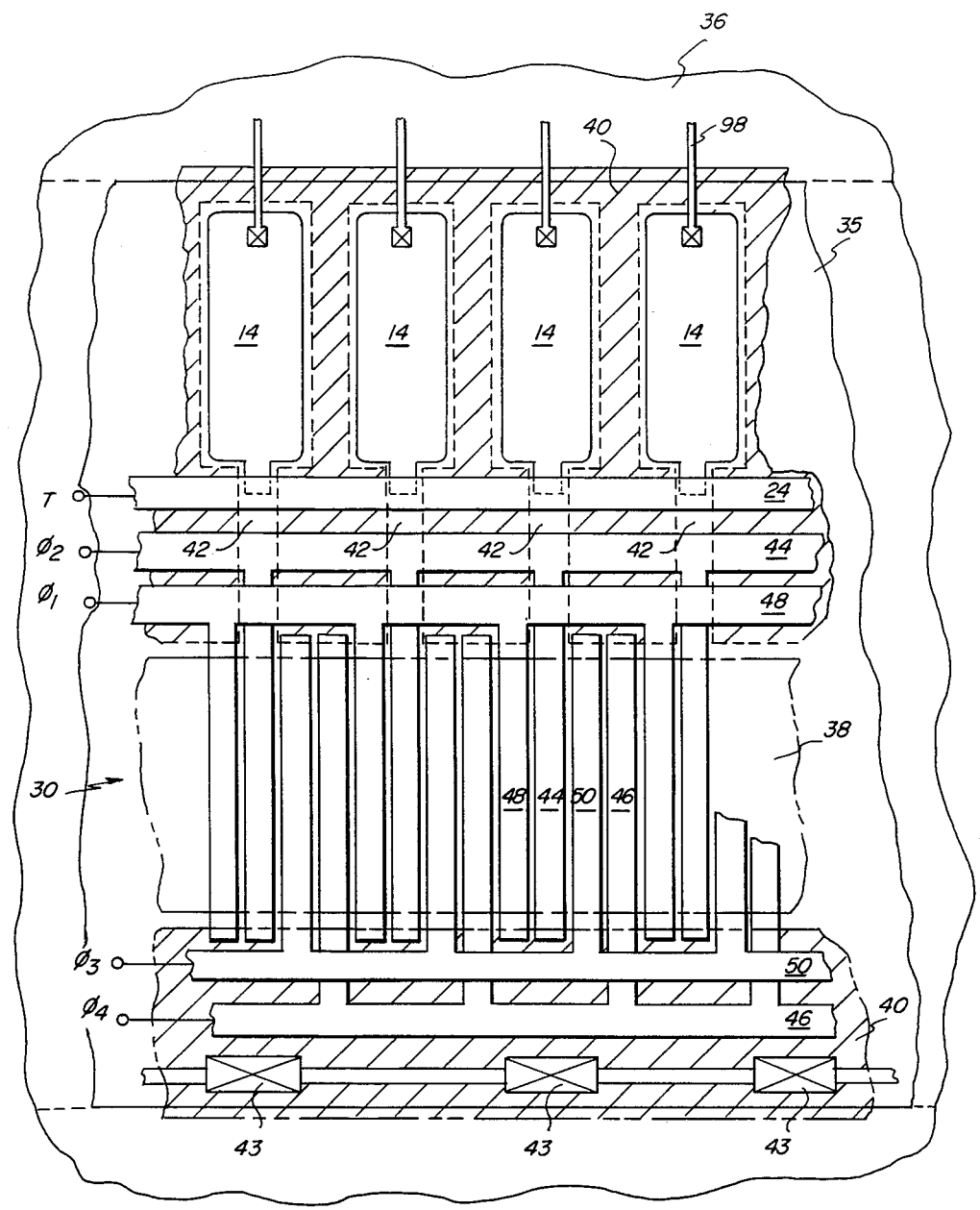
FIG. 4 is a partial plan view showing the storage diodes and charge transfer gates of the charge coupled device shift register in an integrated image sensor according to the preferred embodiment of the present invention.

FIG. 4 is a partial plan view illustrating the storage diodes 14 of the photosensitive elements, the transfer gate 24, and the electrode and channel structure of the CCD shift register 30.

The device was constructed using well known CMOS fabrication techniques in a p-well 35 on an n-type silicon substrate 36. The device is constructed in isolating wells using CMOS technology so that the photodiodes described below will be electrically isolated from the rest of the circuit. The CCD shift register is of the buried channel variety, employing an n-type region 38 as shown by chain lines in the p-well 35 to form the buried charge transfer channel. The storage diodes 14 are formed by n+-type regions in the p-well substrate. Channel stopping regions 40 shown by cross-hatching surrounding the storage diodes and the CCD shift register channel, comprise for example, p+-regions under thickened field oxide. Contact to the p-well is provided by contact windows 43 in the p+-regions of the p-well. Gaps 42 in the channel stopping regions 40 between the storage diodes 14 and the buried channel 38 of the CCD shift register allow the formation of surface channels communicating between the storage diodes and the CCD.

Two levels of polysilicon overlying the surface and buried channels define the transfer electrode structure of the CCD shift register 30 and the transfer gate 24.

A first level of polysilicon defines the phase-2 and phase-4 transfer electrodes (44 and 46 respectively) of the CCD shift register 30, and a second level defines the phase-1 and phase-3 electrodes (48 and 50 respectively) and the transfer gate 24. When voltage is applied to the transfer gate 24 and the phase-2 electrode 44, a surface channel is formed along the gaps 42 in the channel stopping regions, thereby charge coupling the storage diodes 14 with the CCD shift register 30.

Figure 5:
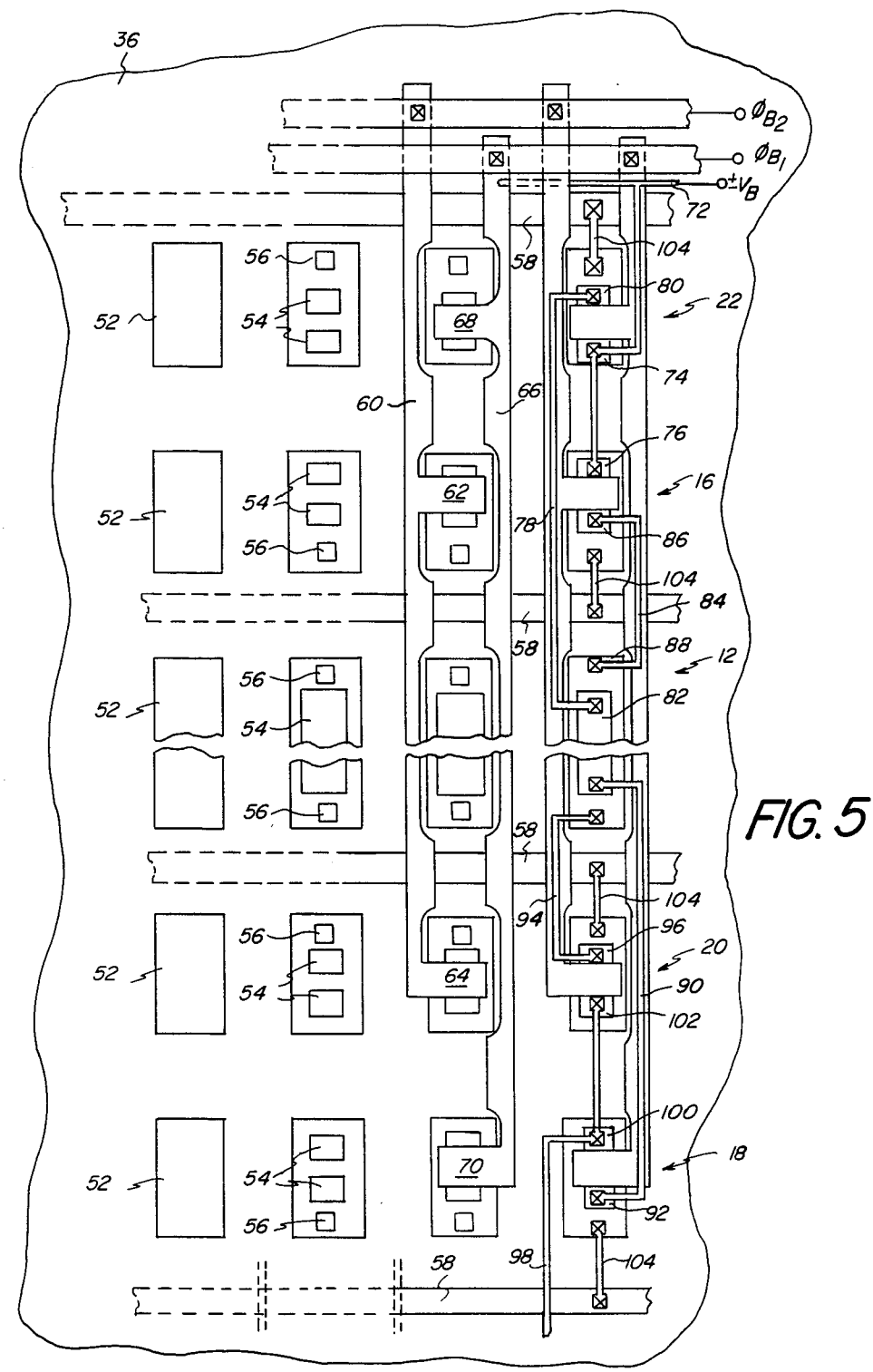
FIG. 5 is a partial plan view showing the bridge network of switches and photosensors in an integrated image sensor according to a preferred embodiment in the present invention.

FIG. 5 is a partial plan view of the bridge network and the photodiode of the photosensitive elements according to the present invention, where features have been added to each successive column starting on the left and culminating in a fully formed bridge network photosensing element in the column on the far right. As illustrated in the first column of FIG. 5, the FET switches 16, 18, 20 and 22 and the photodiode 12 are formed in p-wells 52 in the n-type substrate 36. As illustrated in the second column of FIG. 5, n-type regions 54 in the p-wells form the sources and drains of the FET switches, and the junction for photodiode 12. p+-type regions 56 allow for ohmic contact to be made to the substrate of the FET switches and the anode of photodiode 12.

As shown in the third column of FIG. 5, the first level of polysilicon is patterned to define horizontal conductors 58 and the second level of polysilicon is patterned to define the gates and interconnections of the gates for the FET switches. A first conductor pattern 60 defines the interconnected gates 62 and 64 for FET switches 16 and 20 respectively. A second conductor pattern 66 defines the interconnected gates 68 and 70 of FET switches 18 and 22 respectively. Finally, the column on the far right shows the bridge network photosensitive element with aluminum conductor patterns that complete the circuit. A conductor 72 connects the bias voltage $\pm V_B$ to the sources 74 and 76 of FET switches 22 and 16 respectively. A conductor 78 connects the drain 80 of FET 22 to the cathode 82 of photodiode 12. A conductor 84 connects the drain 86 of FET 16 to the anode 88 of photodiode 12. A conductor 90 connects the anode 82 of diode 12 to the source 92 of FET 18. A conductor 94 connects the cathode 82 of the photodiode 12 to the drain 96 of FET 20, and a conductor 98 connects the drain 100 and the source 102 of FETs 18 and 20 respectively to the cathode of storage diode 14 (see FIG. 4). Finally, conductors 104 connect the substrates of the FET switches 16, 18, 20, and 22 to the horizontal conductors 58 for applying a substrate bias.

Figure 6:
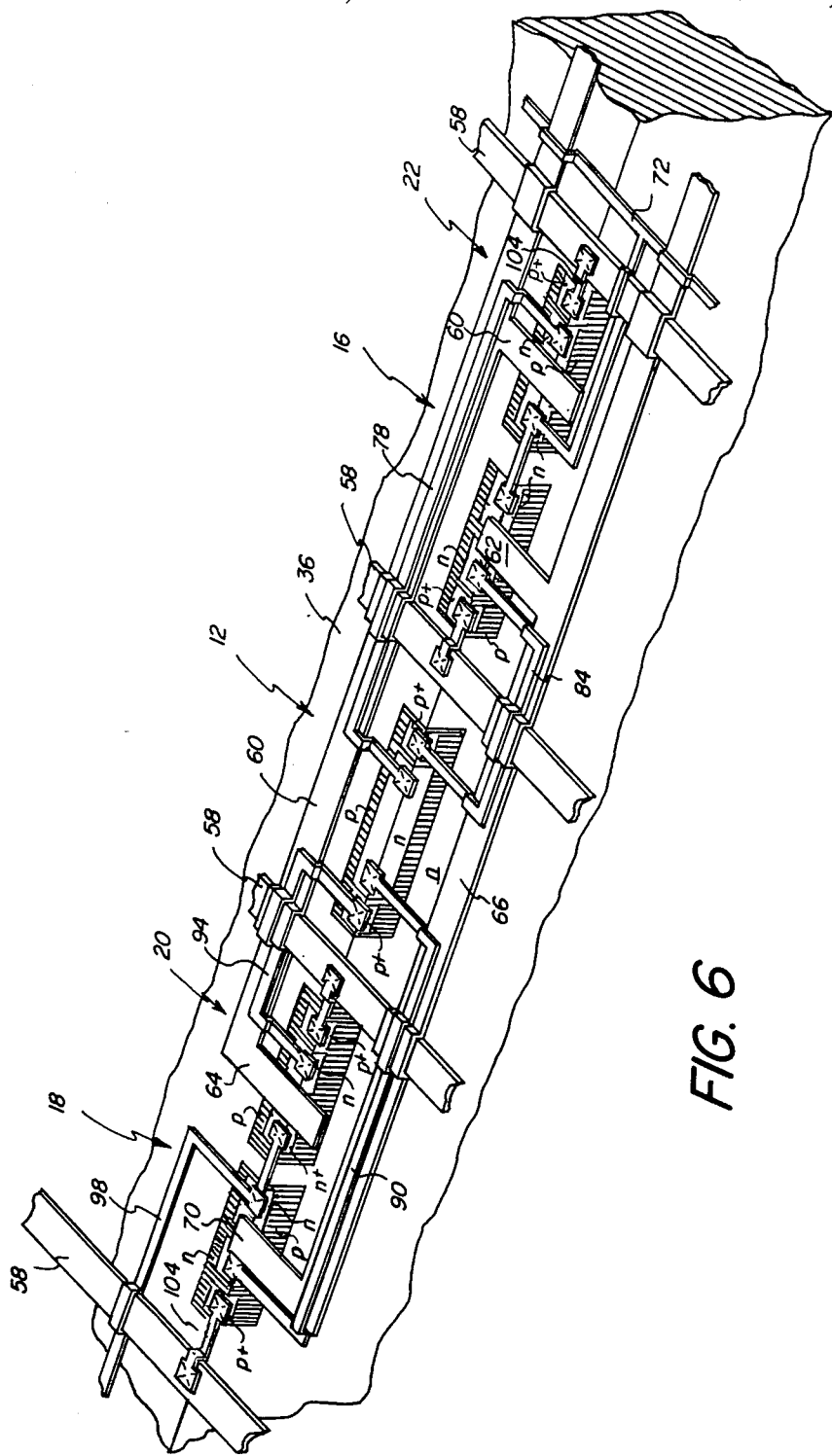
FIG. 6 is a partially broken-away perspective view showing the channels and electrode structure of a preferred embodiment of the bridge network of switches and the photosensor according to the present invention.

FIG. 6 is a perspective view of a portion of one of the bridge network photosensing elements with the substrate broken away to reveal a cross section of the device along a line through the middle of the FETs 16, 18, 20 and 22 and photodiode 12. Not shown in FIG. 6, are the layers of insulating oxide between the respective layers of polysilicon and aluminum conductors, which are provided in a known manner according to well known integrated circuit manufacturing techniques.

Figure 7:
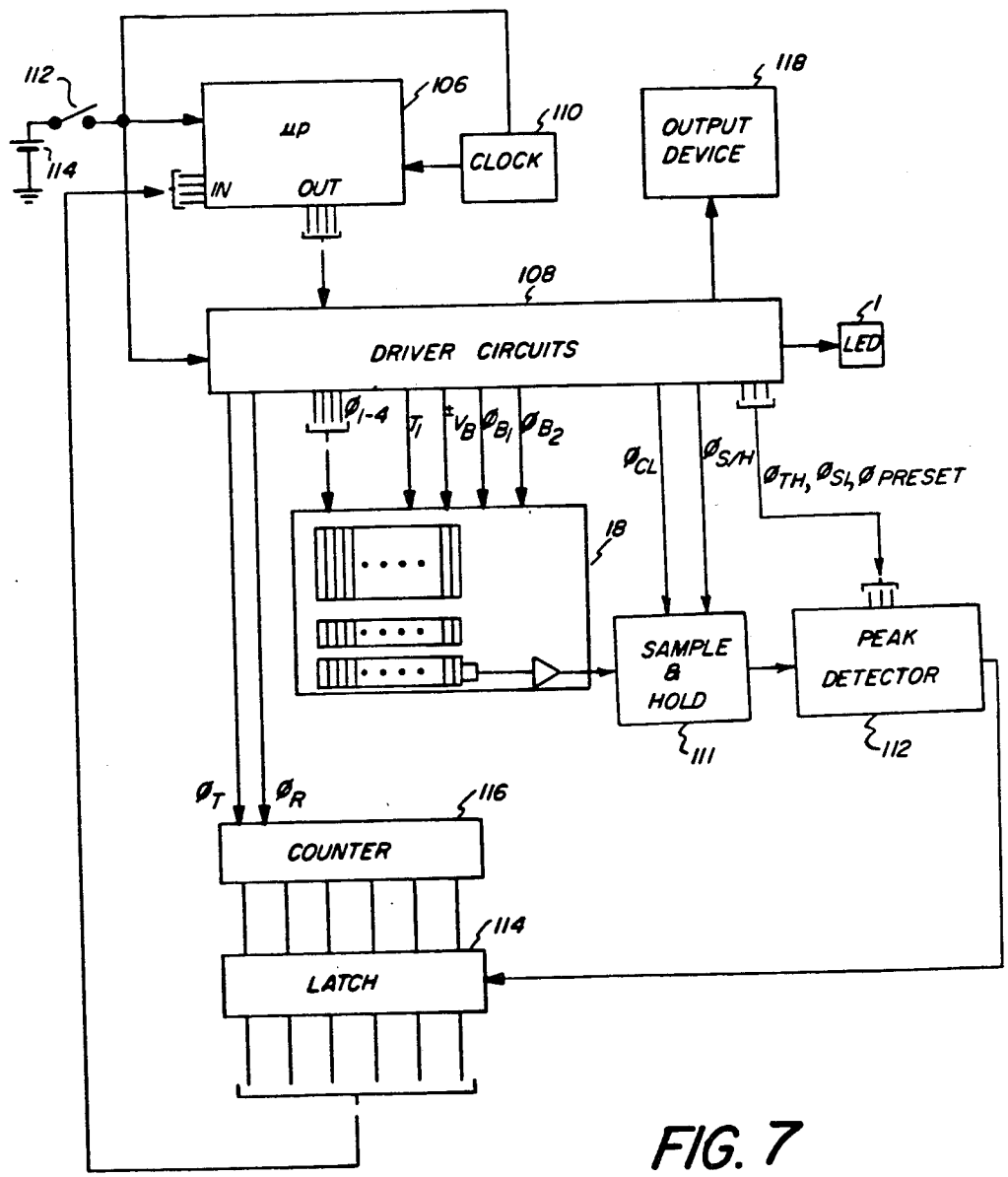
FIG. 7 is a schematic block diagram showing the signal processing and control electronics of a rangefinder having a bridge network image sensor according to the present invention.

Referring now to FIG. 7, overall control of the rangefinder is provided by a programmed microprocessor 106, (or alternatively with custom integrated circuits designed to perform the same functions and integrated on the same chip as the image sensor) through conventional driver circuits 108. The microprocessor is supplied with timing signals from a clock circuit 110 and with power via a main power switch 112 from a battery 114. Four-phase clock signals $\Phi_{1-4}$, a transfer signal $T_1$, bias voltage $\pm V_B$ and bridge control signals $\Phi B_1$ and $\Phi B_2$ are supplied to the linear image sensor 18 from driver circuits 108 under control of microprocessor 106 to produce output signals from the CCD shift register of the image sensor 18. The photosignals from the CCD shift register are sampled by a sample and hold circuit 111 and are supplied to a peak detector 112, that produces a pulse each time a photosignal larger than any previous photosignal is produced by image sensor 18. Features relating to the peak detector circuit are claimed in copending U.S. patent application entitled "Rangefinder with Serial Readout Linear Image Sensor and Peak Detector with Threshold Setting Means" by D. Lambeth. The output of peak detector circuit 112 is supplied to a latch circuit 114. Latch circuit 114 is connected to receive the output count of a digital counter 116. Counter 116 receives a reset signal $\Phi_R$ and a timing signal $\Phi_T$, having the same frequency as the four-phase clock signals $\Phi_{1-4}$. The output of the latch circuit 114 is supplied to an input port of microprocessor 106.

The drive circuit 108 also powers an LED 1 and an output device 118 such as a range display or a range servo.

Figure 8:
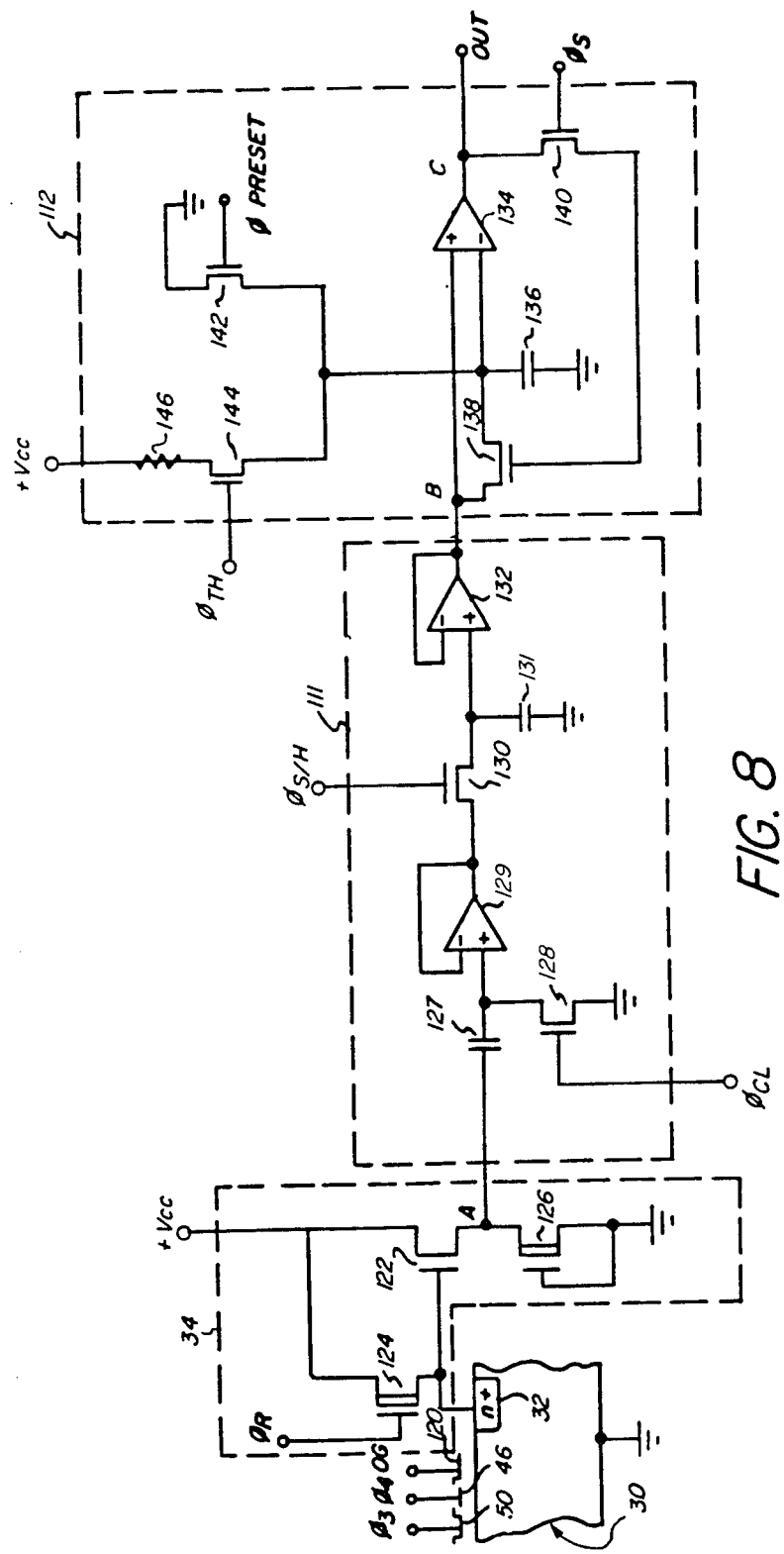
FIG. 8 is an electrical circuit schematic diagram showing the signal processing electronics for reading out and peak detecting the signal produced by the image sensor according to the present invention.

FIG. 8 is a more detailed circuit schematic of the output preamplifier 34 of the image sensor 18, the sample and hold circuit 111, and the peak detector 112. A portion of the CCD shift register 30 showing an output gate 120 and an output diode 32 are also shown.

The output preamplifier 34 is an on-chip sense and reset amplifier including a sense FET 122 and a reset FET 124. The sense FET 122 is a surface channel device and reset FET 124 is a buried channel device, thereby simplifying the power supply requirements of the circuit. A buried channel FET 126 is connected between the drain of the FET 122 and ground in a constant configuration for converting the sensed charge on diode 32 to an output voltage at node A.

The sample and hold circuit 111 includes a clamping portion comprising a series capacitor 127, a clamping FET 128, and a buffer amplifier 129; and a sample and hold portion comprising a sampling FET 130, a storage capacitor 131, and an amplifier 132. Samples of the signal voltage at node A are taken by applying a clamping pulse $\Phi_{CL}$ to the gate of FET 128 while the voltage at node A is at the reset level, then applying a sampling pulse $\Phi_{S/H}$ to the gate of FET 130 when the voltage at node A is at the final signal level, thereby removing any variations from the signal caused by reset noise. The final signal voltage is stored on capacitor 131 and reproduced at node B by amplifier 132 until the next sample is taken.

Peak detection of the voltages at node B is accomplished by a comparator 134, a reference capacitor 136, a sampling FET switch 138, and a timing FET switch 140. The peak detector circuit 112 includes a threshold setting portion comprising a preset FET switch 142 connecting capacitor 136 to ground, and a threshold setting FET switch 144 connecting the capacitor 136 to controlled voltage source $V_{cc}$ through a resistor 146.

Figure 9:
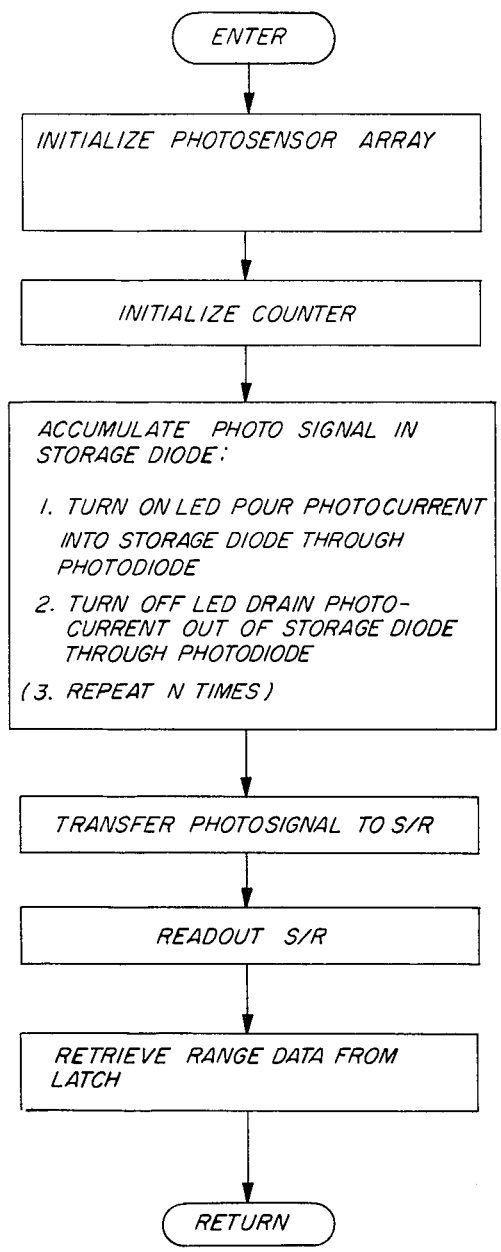
FIG. 9 is a flow chart showing the general operation of the rangefinder device according to the present invention.
Figure 10:
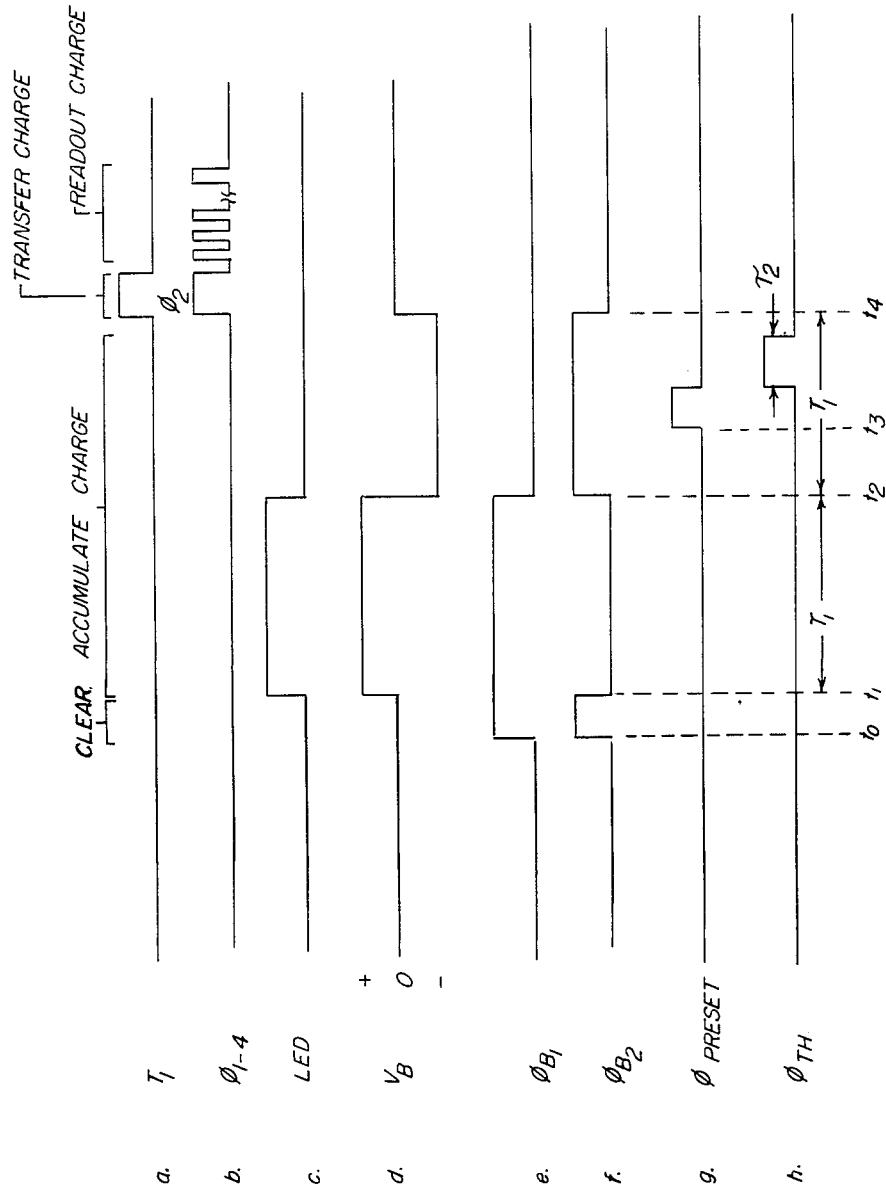
FIGS. 10 and 11 are timing diagrams useful in explaining the operation of the rangefinder device according to the present invention.
Figure 11:
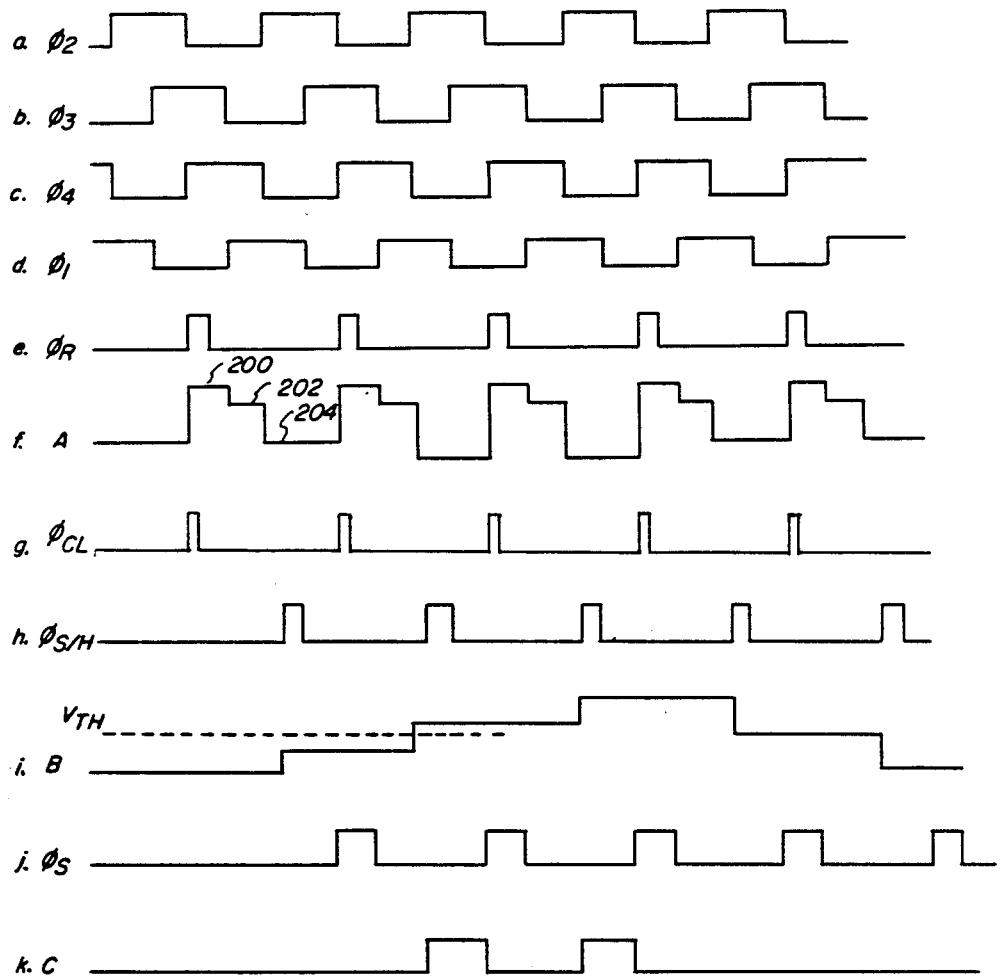

The operation of the rangefinder will now be described with reference to FIGS. 9, 10 and 11. FIG. 9 is a flow chart showing a control program for the microprocessor 106 (see FIG. 7). The program starts, for example upon closure of main power switch 106 at time $t_0$ by initializing the image sensor. The image sensor is initialized by supplying control signals $\Phi B_1$ and $\Phi B_2$ to simultaneously close all four FET switches 16, 18, 20, and 22 while the bias voltage $V_B$ is held at the ground potential (see FIGS. 10 d, e, f), thereby grounding the anodes and cathodes of both the photodiode 12 and the storage diode 14. Next, the microprocessor sends a reset signal $\Phi_R$ to counter 116 to initialize the counter. Then, at time $t_1$, the microprocessor turns on the LED, sets the bias voltage $\pm V_B$ on the sensor element positive (+), and opens FET switches 16 and 20 by commanding $\Phi B_2$ low, thereby connecting the photodiodes 12 to supply photocharge to the respective storage diodes 14. This condition is maintained for a time $\tau_1$ while photocharge generated by both ambient scene illumination and the light supplied by LED 10 is accumulated in the storage diodes. At time $t_2$, the LED is turned off, the polarity of the bias voltage $\pm V_B$ is reversed, FET switches 18 and 22 are opened, and switches 16 and 20 are closed (see FIGS. 10c-f). The photodiodes 12 are now connected to remove photocharge due to ambient scene illumination from the storage diodes 14. This condition is maintained for a time $\tau_1$ to remove exactly the same amount of background photocharge as was added in the previous step. The photocharge remaining on the storage diodes 12 after the second integration time $\tau_1$ is due solely to the light from the LED. Alternatively, the steps of accumulating photocharge with the LED on and removing photocharge with the LED off may be repeated several times to increase the final signal level without significantly increasing the noise, thereby improving the signal-to-noise ratio of the device.

At time $t_3$, prior to the expiration of the second time delay $\tau_1$ (or the final time delay $\tau_1$ if several repeats are employed), the signal processing circuitry is initialized to set the threshold of the peak detector circuit. FET switch 142 (see FIG. 8) is turned on momentarily by generating a $\Phi_{preset}$ pulse (FIG. 10g) thereby grounding capacitor 136. Then FET switch 144 is turned on for a time $\tau_2$ to charge capacitor 136 to a value determined by the time constant of resistor 146 and capacitor 136. At time $t_4$ the photocharges remaining in storage diodes 14 are transferred to the CCD shift register by applying a pulse $T_1$ to the transfer gate 24 while the voltage on the phase 2 electrode $\Phi_2$ is held high (see FIGS. 10a and b). The CCD shift register is then read out to generate the range signal by applying the four-phase clock signals $\Phi_{1-4}$ to the charge transfer electrodes 44, 46, 48, and 50 (see FIG. 10b).

Processing of the photosignals from the CCD will now be described with reference to FIG. 11. The four-phase clock signal $\Phi_{1-4}$ are shown in FIGS. 11a–d. While the signal charge resides under the phase-three electrode 50 and the phase-four electrode 46 ($\Phi_3$ and $\Phi_4$ simultaneously high) a reset pulse $\Phi_R$ is applied to buried channel FET transistor 124 in output preamplifier 34 to prepare the output diode 32 to receive signal charge. At this point, the voltage at output node A (200 in FIG. 11f) goes to a high level. When the voltage applied to the phase-three electrode 50 is removed ($\Phi_3$ goes low), some of the photocharge may spill over the output gate 120, which is held at a fixed potential, onto the output diode 32, causing the voltage at node A to go to an intermediate level (202 in FIG. 11f). Finally, when the voltage on the phase-four electrode 46 ($\Phi_4$) goes low, the remainder of the signal charge is moved to the output diode 32, causing the voltage at node A to reach its final value (204 in FIG. 11f).

While the signal is at its reset level 200, a clamping pulse $\Phi_{CL}$ (see FIG. 11g) is applied to clamping FET 128, then when the final signal value is present at node A, a sampling pulse $\Phi_{S/H}$ is applied to FET sampling transistor 130 (see FIG. 11h) thereby storing the final voltage on storage capacitor 131. The voltage on capacitor 131 is followed by sample and hold amplifier 132 and produced at node B of the circuit (see FIG. 11i).

The voltage at node B is a step-wise smooth curve representing the successive values of the photosignals from successive photosensitive elements of the image sensor. Comparator 134 compares the first sample with the threshold voltage $V_{TH}$ (see FIG. 11i) stored in capacitor 136. If the sampled value is less than the threshold value, the output of comparator 134 at node C remains low. If, on the other hand, the sampled value exceeds the threshold value, the comparator produces a high output at node C. At a point during the presence of the sampled value, a sample signal $\Phi_S$ (see FIG. 11j) is applied to FET transistor 140. If the voltage at node C is low at this time, the low value will be applied to the gate of FET transistor 138, which will have no effect on the state of the circuit. If however, the voltage at node C is high, the high voltage will be applied to the gate of transistor 138, thereby applying the new higher reference value to capacitor 136. The new reference value is equal to the input at node B, thereby causing the output at node C to go low (see FIG. 11k). This process continues, producing a pulse at node C each time a new greater output value is received from the sensor array.

At the start of the sequence, counter 116 was initialized. Each time a new charge packet is read from CCD shift register 30, counter 116 is advanced (see FIG. 7). The pulse train produced by the peak detector circuit at node C is applied to latch 114 which captures and holds the output of counter 118 whenever a pulse is received from the peak detector. After all the charge packets have been read out of the CCD shift register, the count held by latch 116 is indicative of the location of the sensor element receiving the greatest illumination from the LED above the threshold level $V_{TH}$. At this point, the microprocessor retrieves the range data from the latch 114 by interrogating its input port. The range data are used in a known manner to drive an output device such as a range display or a range servo.

The invention has been described with reference to a preferred embodiment thereof, however it will be apparent that changes and modifications can be effected within the spirit and scope of the accompanying claims.

We claim:

1. In a rangefinding device of the type having means for projecting a beam of light to illuminate a small area on an object in a scene, and a plurality of photosensitive elements arranged to detect the location of the small area to determine the distance to the object, said rangefinding device including means for removing signal contributions due to ambient scene illumination from the photosignals produced by said photosensitive elements by sensing the scene with the light beam on, sensing the scene with the light beam off, and differencing the respective signals produced thereby, the improvement comprising:

photosensitive means for producing a photocurrent in response to incident light;

charge storage means for accumulating photocurrent; and switching means for selectively connecting said photosensitive means to said charge storage means to add photocurrent to said charge storage means when said light beam is on, and to remove photocurrent from said charge storage means when said light beam is off, whereby the difference signal thus remaining in said charge storage means is free from contributions due to ambient scene illumination.

2. The invention claimed in claim 1, wherein said photosensitive means is a photodiode, said charge storage means is a diode, and said switching means comprises FET transistors connecting said photodiode to said storage diode in a bridge configuration.

3. In a rangefinding device of the type having means for projecting a beam of light to illuminate a small area on an object in a scene, and a solid state image sensor for viewing the scene and detecting the location of the small area to determine the distance to the object, said rangefinding device including means for removing signal contributions due to ambient scene illumination from the photosignals produced by the image sensor by: (1) sensing the scene with the light beam on, (2) sensing the scene with the light beam off, and (3) differencing the signals produced by the image sensor, the improvement comprising:

a linear array of photosensitive elements having photosensing means for producing a photocurrent in response to incident light, charge storage means for accumulating photocurrent, and bridge network switching means for selectively connecting said photosensing means to said charge storage means in such a way as to (a) add photocurrent to said charge storage means while said light beam is on, and (b) remove photocurrent from said charge storage means while said light beam is off, whereby the difference signals remaining in said charge storage means are free from contributions due to ambient illumination;

a charge coupled device (CCD) shift resister; and transfer gate means for transferring said difference signals from said charge storage means in parallel into said CCD shift register whereby said difference signals delivered from said CCD shift register may be compared to determine the location of said small illuminated area.

4. The invention claimed in claim 3, wherein said photosensing means comprise photodiodes, said charge storage means comprise storage diodes and said bridge network switching means comprise FET transistors connecting said photodiodes to said storage diodes in a bridge configuration, and wherein said elements are integrated on a common substrate.

5. A rangefinding device of the type having means for projecting a beam of light to illuminate a small area on an object in a scene, an image sensor for sensing the light from a scene and producing photosignals representative thereof, and means responsive to the photosignals produced by said image sensor for detecting the position of the illuminated small area in the scene to determine the distance to the object, said rangefinding device including means for removing background noise from the photosignals produced by said image sensor by sensing the scene with the beam of light turned on and again with the beam of light turned off and differencing the signals produced thereby, characterized in that said rangefinding device includes:

an image sensor having an array of photosensors (12) responsive to scene light for producing photocurrent, an array of charge storage elements (14), switching means (16, 18, 20, and 22) for selectively connecting said photosensor to said charge storage elements in such a manner as to (a) add photocurrent to said charge storage elements, and (b) remove photocurrent from said charge storage elements; and control means (106) for energizing said light beam and for connecting said switching means to add photocurrent to said charge storage elements and for deenergizing said light beam and connecting said switching means for removing photocurrent from said storage elements, whereby the difference signals remaining in said charge storage elements are free from contributions due to ambient scene illumination.

6. The invention claimed in claim 5, wherein said photosensors are photodiodes, said charge storage elements are storage diodes, and said switching means are FET transistors connecting said photodiodes to said charge storage diodes in a bridge configuration.

* * * * *